United States Patent
Hamano (10) Patent No.: US 7,362,934 B2
(45) Date of Patent: Apr. 22, 2008

(54) OPTICAL CONNECTING DEVICE AND CONNECTOR

(75) Inventor: Toshihisa Hamano, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 0 days.

(21) Appl. No.: 11/388,200

(22) Filed: Mar. 24, 2006

(65) Prior Publication Data

US 2006/0215963 A1 Sep. 28, 2006

(30) Foreign Application Priority Data

Mar. 25, 2005 (JP) ............................. P2005-088724
Mar. 22, 2006 (JP) ............................. P2006-079815

(51) Int. Cl.
*G02B 6/30* (2006.01)
*G02B 6/36* (2006.01)

(52) U.S. Cl. ...................... 385/49; 385/14; 385/50; 385/88

(58) Field of Classification Search .................. 385/14, 385/49–52, 33, 65, 83, 89
See application file for complete search history.

(56) References Cited

U.S. PATENT DOCUMENTS

| | | | |
|---|---|---|---|
| 6,236,788 B1 * | 5/2001 | Moisel | 385/52 |
| 6,694,068 B2 * | 2/2004 | Parker | 385/14 |
| 7,210,861 B2 * | 5/2007 | Nagasaka et al. | 385/88 |
| 2003/0091290 A1 * | 5/2003 | Whitehead | 385/50 |
| 2003/0231833 A1 * | 12/2003 | Lerner et al. | 385/49 |
| 2005/0018993 A1 * | 1/2005 | Rolston et al. | 385/137 |
| 2005/0100264 A1 * | 5/2005 | Kim et al. | 385/14 |
| 2006/0210225 A1 * | 9/2006 | Fujiwara et al. | 385/92 |
| 2006/0239605 A1 * | 10/2006 | Palen et al. | 385/14 |

FOREIGN PATENT DOCUMENTS

| JP | 9-90154 | 4/1997 |
|---|---|---|
| JP | 2765112 | 4/1998 |
| WO | WO 2004097481 A1 * | 11/2004 |

OTHER PUBLICATIONS

Matsui, Teruhito, "General Summary of Research and Development of Opto-Electronic Mounting Technology," Fifth Research Report of Electronic Si, pp. 77-89, Association of Super-Advanced Electronics Technologies, Feb. 26, 2004.

* cited by examiner

*Primary Examiner*—Hemang Sanghavi
(74) *Attorney, Agent, or Firm*—Morgan, Lewis & Bockius LLP (57) ABSTRACT

An optical connecting device includes a substrate including an optical waveguide, and a connecting portion provided on the substrate and optically connecting to the optical waveguide. The connecting portion includes a base provided with a groove that fixes an optical fiber and a 90 degrees optical path conversion mirror disposed to face an end of the optical fiber.

20 Claims, 12 Drawing Sheets

OPTICAL CONNECTING DEVICE AND CONNECTOR

CROSS-REFERENCE TO RELATED APPLICATIONS

This application is based on and claims the benefit of priority from the prior Japanese Patent Application No. 2005-088724, filed on Mar. 25, 2005; the entire contents of which are incorporated herein by reference.

This application is also based on and claims the benefit of the Japanese Patent Application No. [number] filed [date] entitled "OPTICAL CONNECTING DEVICE" listing Toshihisa HAMANO as inventor and Fuji Xerox Co., Ltd., as applicant, which is hereby incorporated by reference.

BACKGROUND

1. Technical Field

The present invention relates to an optical connecting device for taking an external optical signal transmitted through an optical fiber in an optical waveguide provided on a substrate.

2. Related Art

With the recent increase of signal transmission rate, the electric signal transmission system and the signal transmission system using an optical transmission medium have been proposed in various fields. For example, the printed wiring board assembly (PWBA) including an optical waveguide has become more important for the development of optoelectronic technology. An end portion of the optical waveguide provided in the PWBA is used as an optical input portion for taking in light from an optical fiber or an optical output portion for taking out light from an inside of the PWBA (a case where external light is taken in the PWBA will be described in the following description, since it is the same, in configuration, as a case where light is taken out from the PWBA).

SUMMARY

According to an aspect of the present invention, an optical connecting device includes a substrate including an optical waveguide, and a connecting portion provided on the substrate and optically connecting to the optical waveguide. The connecting portion includes a base provided with a groove that fixes an optical fiber and a 90 degrees optical path conversion mirror disposed to face an end of the optical fiber.

BRIEF DESCRIPTION OF THE DRAWINGS

Exemplary embodiment(s) of the present invention will be described in detail based on the following figures, wherein:

FIGS. 1A and 1B show an optical connecting device according to an exemplary embodiment, in which

FIGS. 2A and 2B show a ferrule according to another exemplary embodiment, in which

FIGS. 6A to 6C show a pattern of anisotropic etching of Si, in which

FIGS. 8A and 8B show an example of a connecting of the waveguide board and the ferrule for optical fibers by positioning, in which

FIGS. 9A and 9B show an optical connecting device according to another exemplary embodiment, in which

DETAILED DESCRIPTION

Figure 1A:
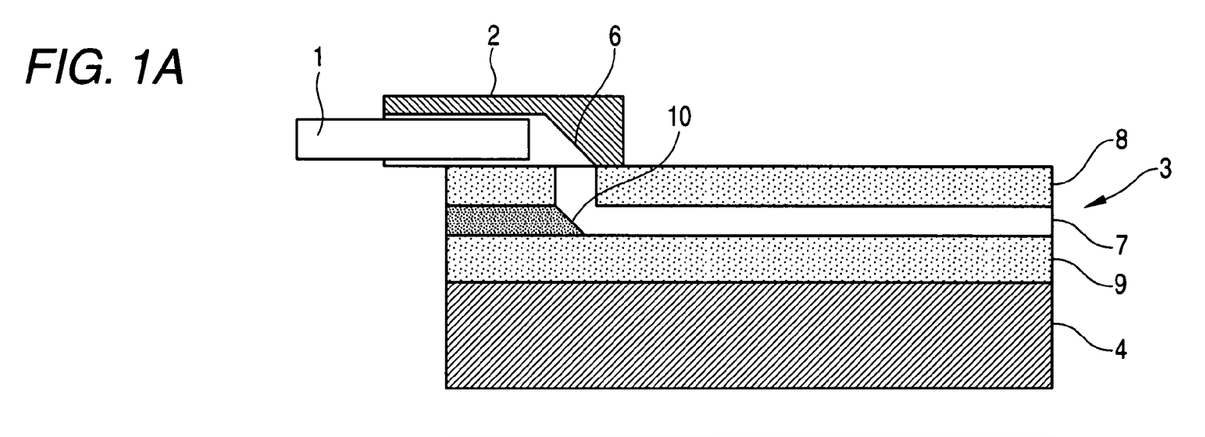
FIG. 1A is a cross sectional view thereof and FIG. 1B is a plan view thereof.
Figure 1B:
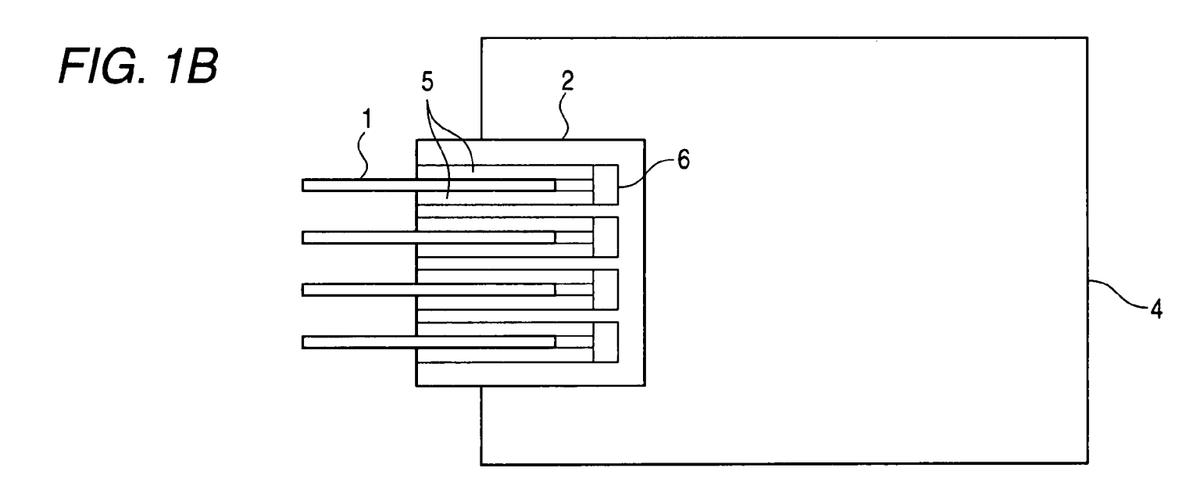

FIGS. 1A and 1B show an exemplary embodiment of an optical connecting device, in which FIG. 1A is a cross section of the optical connecting device and FIG. 1B is a plan view thereof. In the plan view, some of the constructive members are removed or made transparent in order to show an internal structure. The exemplary embodiment shown in FIGS. 1A, 1B includes a ferrule 2 for positioning and fixing optical fibers 1 and a substrate 4 (hereinafter, referred to as "board 4") in which an optical waveguide having an optical waveguide path 3 is provided. The ferrule 2 serves as a connecting portion or a connector optically connectable to the optical waveguide 3. In the exemplary embodiment, the optical fiber 1 includes 4 optical fibers (4 channels) However, the number of optical fibers is not limited to four. The optical fibers 1 are arranged in respective V-grooves 5 formed in the ferrule 2. The V-grooves 5 substantially have V-like shape in a cross section. A 90 degrees optical path conversion mirrors 6 (herein after referred to as "45 degrees slanted mirrors 6") each of which is a flat mirror slanted with respect to a reflection surface of the optical fiber 1 by 45 degrees, are provided on the ferrule 2. Although, in the exemplary embodiment, the 45 degrees slanted mirror 6 is formed for each channel, it is possible to form the 45 degrees slanted mirror 6 to cover all of the 4 channels. The V-grooves 5 and the 45 degrees slanted mirror 6 can be formed integrally with the ferrule by, for example, anisotropic etching of Si as will be described later.

On the other hand, the optical waveguide 3 provided in the board 4 includes a core 7 for guiding light and a clad surrounding the core 7. An upper clad portion 8 and a lower clad portion 9 of the clad pinches the core 7. Although, in this exemplary embodiment, thicknesses of the core 7, the upper clad portion 8 and the lower clad portion 9 are 50 to 100 μm, 10 to 30 μm and about 100 μm, respectively, the thicknesses thereof are not limited thereto. As shown, 90 degrees optical path conversion mirrors 10 (Hereinafter, referred to as "45 degrees slanted mirrors 10") are formed in the optical waveguide 3. Therefore, light beams from the optical fibers 1 are bent by 90° by the optical path conversion mirrors 6 of the ferrule 2 to proceed to the optical waveguide 3 of the board 4 and then bent by 90° again by the 45 degrees slanted mirrors 10 in the optical waveguide 3, so that the light beams are guided in parallel to the board 4. It is possible to guide light beams in the optical waveguide 3 to the optical fibers 1 in the reverse direction. In FIG. 1A, openings are formed in the upper clad portion 8 between the 45 degrees slanted mirrors 6 and 10. However, when the upper clad portion 8 is formed of a material having high transparency, there is no need of providing the opening, so that the step of forming the opening can be omitted.

Figure 2A:
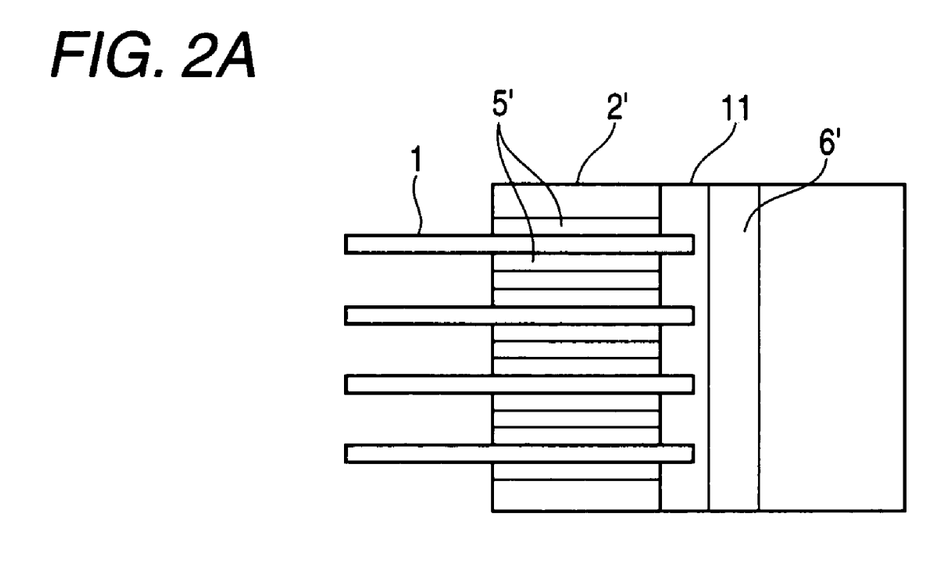
FIG. 2A is a plan view and FIG. 2B is a cross sectional view.
Figure 2B:
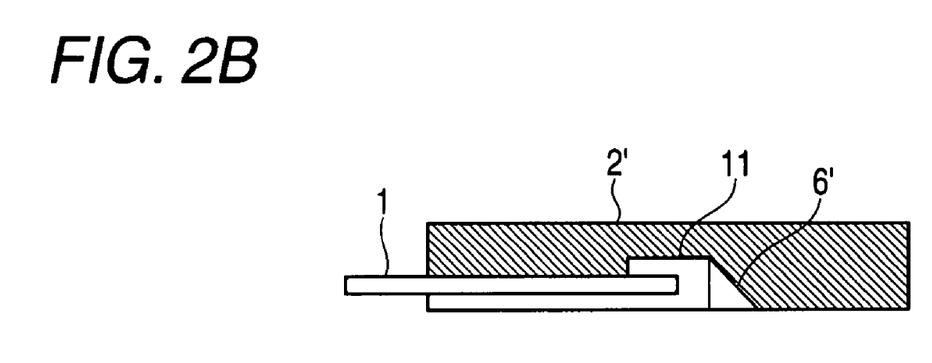

FIGS. 2A and 2B show another exemplary embodiment of the ferrule, in which FIG. 1A is a plan view and FIG. 1B is a cross sectional view of the ferrule. In the exemplary embodiment, an 45 degrees slanted mirror 6' is provided to cover 4 channels. The remaining configuration of this exemplary embodiment is the same as that shown in FIGS. 1A and 1B. The 45 degrees slanted mirror 6' is formed by not anisotropic etching but, for example, dicing a ferrule 2' having V-grooves 5' in a direction orthogonal to the V-groves 5' and then forming a recess portion 11 by removing a boundary portion between the V-grooves 5' and the 45 degrees slanted mirror 6' by a dicer. The V-grooves 5' substantially have V-like shape in a cross section. Thus, the ferrule 2' having the common mirror 6' covering 4 channels is formed.

As described, light is inputted vertically to the opto-electronic board surface by providing the 45 degrees slanted mirror for guiding light in the opto-electronic board having the waveguide, similarly to a case of a light input/output with respect to an LSI with an optical input/output portion on a board. The ferrule is mounted on the board such that light from the optical fiber is inputted vertically to the board. The positioning between the ferrule and the board can be done by matching protrusions, which are formed on the board simultaneously with formation of vertical light guiding holes in the board by photo-lithography with using a pattern formed by anisotropic etching of Si or an integral mold part formed of high molecular material on the ferrule. Thus, the ferrule for optical fibers can be connected with the PWBA board including the waveguide with high precision obtainable by the photo-lithography.

The matching of the ferrule with the PWBA board on which the waveguide is formed is performed by matching the protrusions on the board, which are simultaneously formed with formation of the light output of the waveguide, with the recesses of the ferrule holding the optical fibers. The direction orthogonal to the board is regulated by the depth of the positioning recesses (for example, inverted quadrangular pyramid shaped recesses) formed in the ferrule by anisotropic etching and the protrusions of the board. That is, in this state, the matching precision is obtained by matching a clip formed on the board and the ferrule (a module having the optical fibers) by one-touch. By releasing the clip, the ferrule can be easily detached from the board. Since the recesses of the ferrule and the protrusions on the board are connected, the connecting of these two parts is established with sufficiently reliably and the reliability is maintained by the clip.

As mentioned, the positioning is made in not the usual horizontal direction but the vertical direction. With the positioning in the vertical direction, the positioning of the ferrule 2 and the optical waveguide 3 can be easy with high precision, so that it is possible to easily perform the optical connecting of the optical fibers and the optical waveguide. This positioning will be described in detail later.

In the exemplary embodiment shown in FIGS. 1A and 1B, the V-grooves for optical fibers and the 45 degrees slanted mirror are formed by anisotropic etching of Si. However, these portions may be formed by, for example, high precision molding. It is possible to obtain a good mirror surface of the 45 degrees slanted mirror by coating the surface of theere with a metal such as Al or Cr. When the board is formed by anisotropic etching of Si, the mirror covering each of plural optical fibers may be formed by anisotropic etching of Si one by one as in the exemplary embodiment shown in FIGS. 1A and 1B or by physical means such as the dicer as in the exemplary embodiment shown in FIGS. 2A and 2B. Therefore, by using both anisotropic etching and the physical machining, it is possible to fabricate the optical connecting device with high precision at low cost.

Figure 3A:
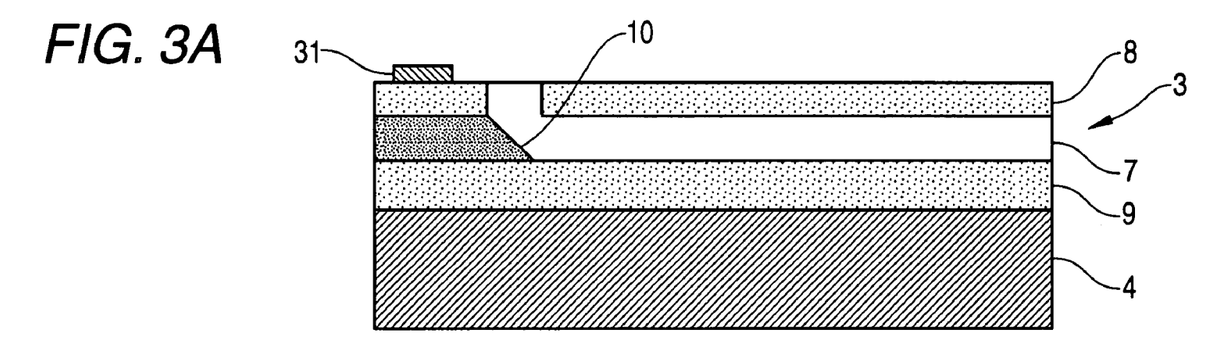
FIGS. 3A and 3B show an example of a fabrication method of a board having an optical waveguide according to the exemplary embodiment.
Figure 3B:
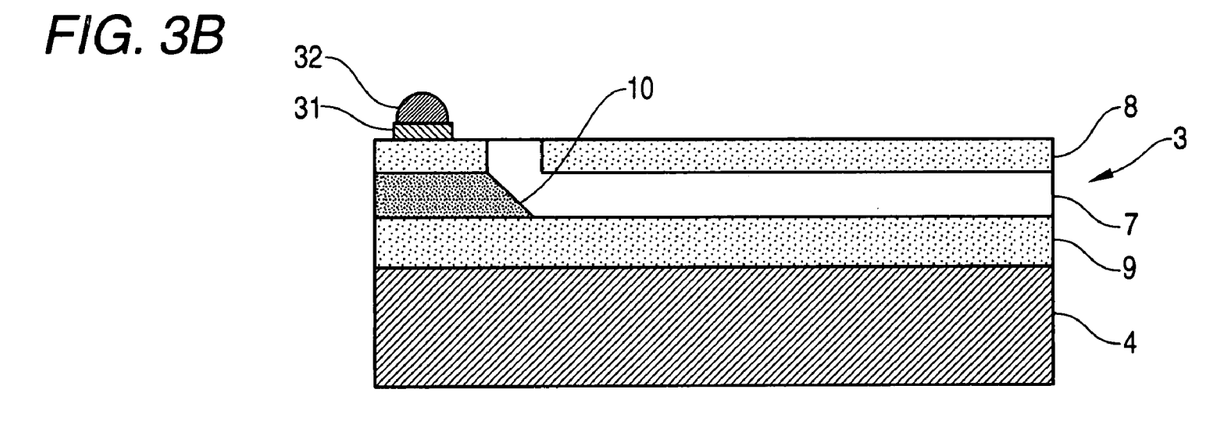

FIGS. 3A and 3B show an example of a fabrication method for fabricating the board having the optical waveguide. First, as shown in FIG. 3A, the lower clad portion 9 about 100 μm thick is laminated on the board 4. A protrusion for the 45 degrees slanted mirror is then formed on the lower clad portion 9 by emboss machining using a mold fabricated by anisotropic etching of Si. The protrusion is coated with a metallic material (Cr or Al) to form a mirror surface. Then the core 7 having thickness of 50 to 100 μm is laminated on the lower clad portion 9. The thickness substantially corresponds to the height of the mirror. Thereafter, a waveguide (core) of a desired pattern is formed by a UV exposure technique or photolithographic technique. Thereafter, the upper clad portion 8 having thickness of 10 to 30 μm is laminated on the waveguide pattern (core 7) thus formed. The opening (optical waveguide) 50 to 100 μm square is formed in a position of the upper clad portion 8 corresponding to the mirror 10 by etching. A laser via drilling may be omitted though there is some transmission loss. After laser via drilling is carried out, the core 7 may be hollow or filled with a material such as resin. In this exemplary embodiment, the 45 degrees slanted mirror is formed by emboss machining. However, for example, the lower clad and the core may be cut by a dicer or laser to form the mirror. Thereafter, an upper electrode pattern is formed by such as screen printing. In forming the upper electrode pattern, positioning pads 31 are formed. Thereafter, as shown in FIG. 3B, solder balls 32 are formed on the positioning pads 31 on the PWBA board as positioning marks 32. That is, the positioning marks 32 are semispherical protrusions. By precisely controlling an area of the pad 31 and an amount of solder of the solder ball 32, it is possible to precisely control height of the solder ball 32 as the positioning marks. The solder ball is used in this exemplary embodiment, but the material for the ball is not limited thereto. A BGA (Ball Grid Array) ball having a resin core may be used in place of the solder ball. Incidentally, the positioning marks in the form of protrusions on the board are not shown in FIGS. 1A and 1B for simplicity of illustration.

Figure 4:
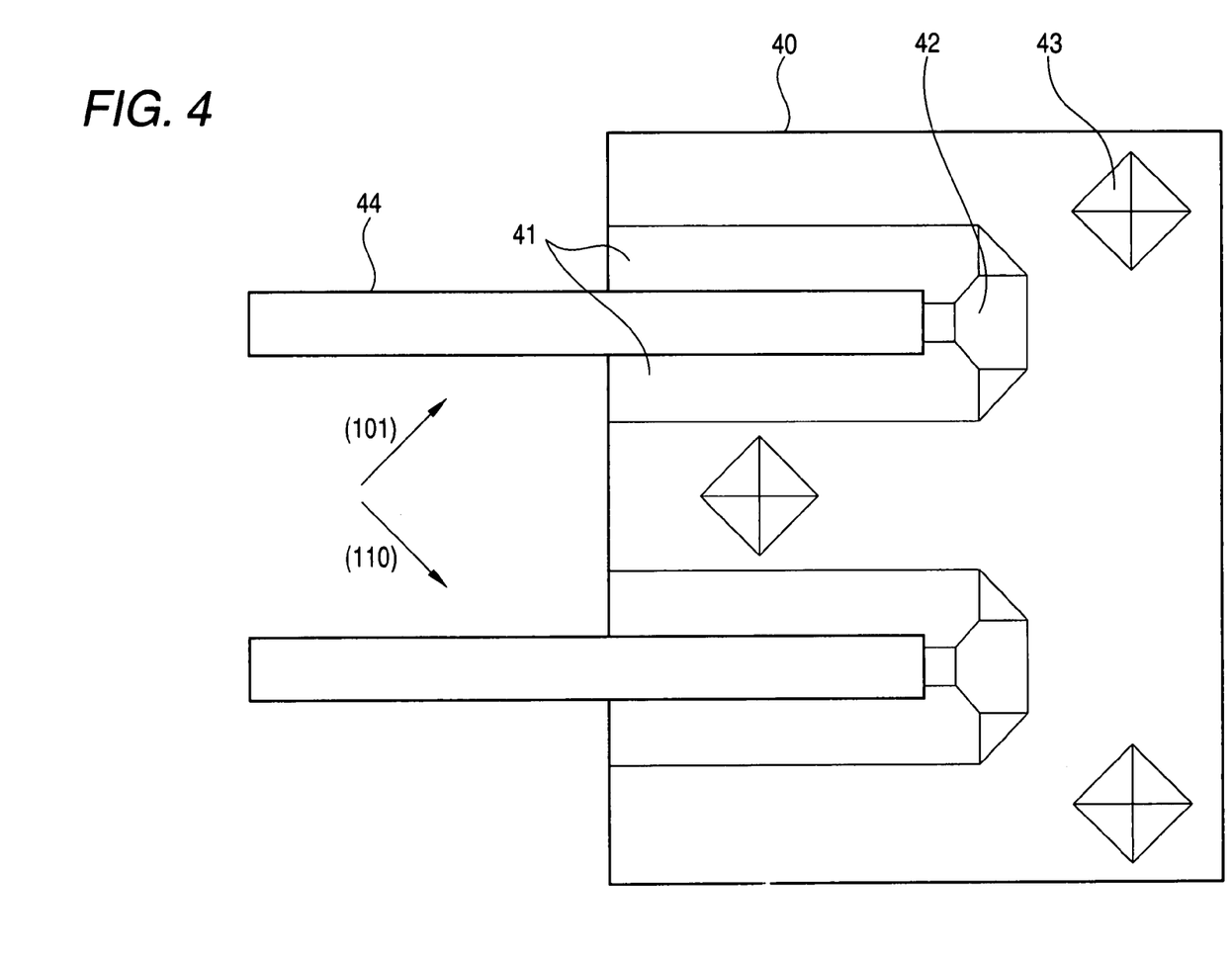
FIG. 4 shows an example of the fabrication method of the ferrule according to the exemplary embodiment.

FIG. 4 shows an example of the fabrication method of the ferrule. A ferrule 40 is formed by using a (100) Si substrate. A pattern of V-grooves 41 and 45 degrees slanted mirrors 42, which are flat mirror slanted by 45 degrees with respect to a crystal face (110) of the Si substrate, and three recesses (positioning marks) 43 each having inverted quadrangular pyramid of 54 degrees along the face (110) and corresponding in position to the protrusions (solder balls) 32 preliminarily provided on the substrate is formed by utilizing the photo-lithography. V-grooves 41 substantially have V-like shape in a cross section.

The size of the inverted quadrangular pyramid shaped recesses 43 can be controlled with several μm precision. The pattern thus prepared is wet-etched for 30 to 60 minutes by an etchant prepared by adding 200 ml/L of IPA (isopropyl alcohol) to about 20% KOH.

Figure 5A:
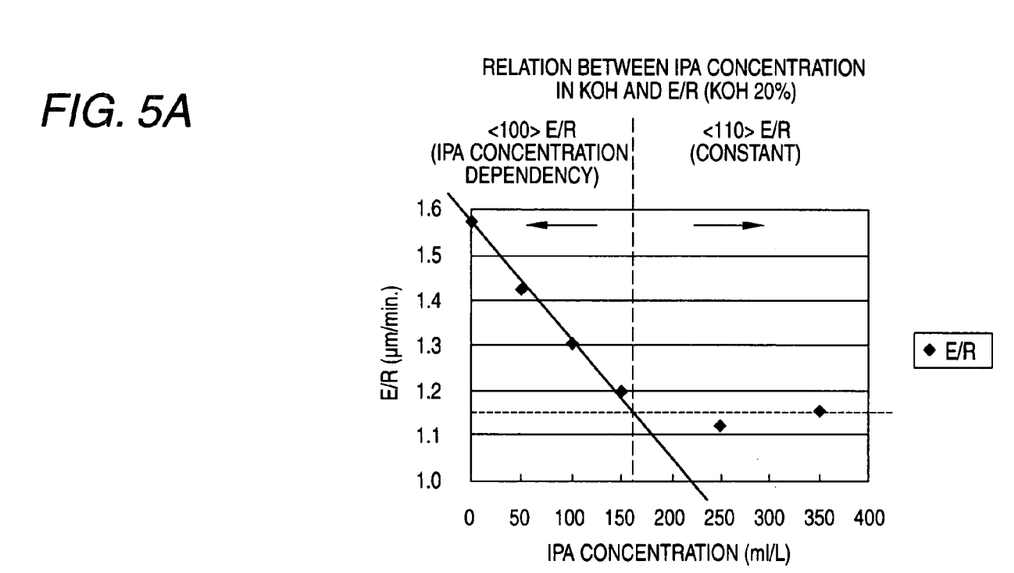
FIGS. 5A and 5B show IPA concentration dependency with respect to KOH used in an etching process.
Figure 5B:
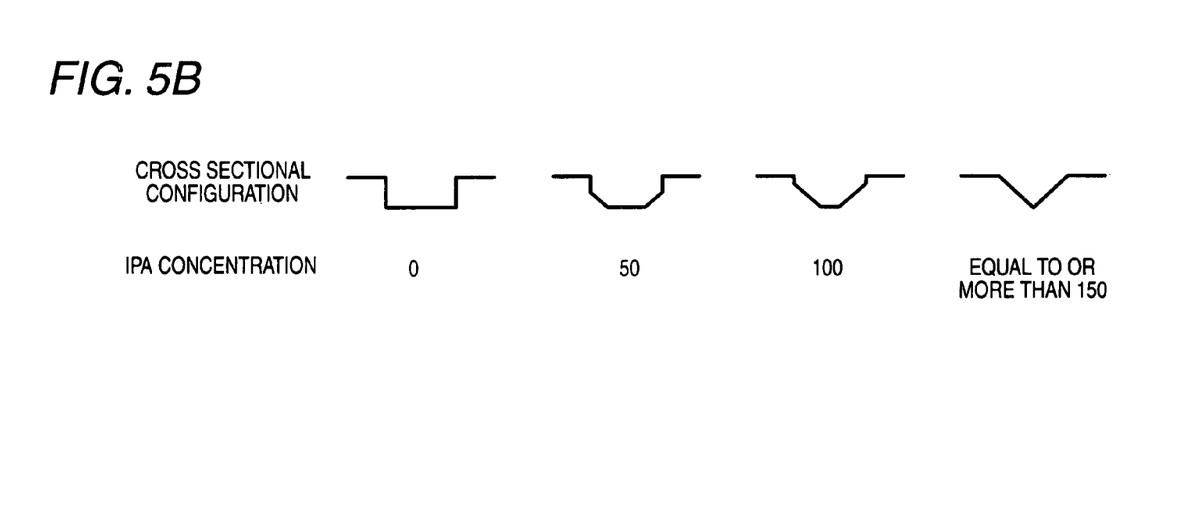

FIGS. 5A and 5B shows the IPA concentration dependency of KOH used in the above mentioned process. The ordinate in FIG. 5A shows E/R (IPA concentration dependency) (μm/min) and the abscissa shows the IPA concentration. FIG. 5B is the cross sectional configuration of a groove etched with respect to IPA concentration and shows that the 45° face can be formed at IPA concentration of 150 ml/L or more. In the pattern in parallel to the face (110), the 54° face, which is obtained by usual anisotropic etching of Si, is obtained. The etchant used in this case is the mixture of KOH and IPA, concentration of which is 150 ml/L or more.

Returning to FIG. 4, it is possible to form the V-grooves 41 for optical fibers 44, which have 45 surfaces, the 45 degrees slanted mirrors 42 and the positioning marks 43, which have surfaces of 54 with respect to the waveguide board, are integrally formed in the ferrule 40 simultaneously, by the process mentioned above. Although this example is for 2-channel optical fiber, it is possible to fabricate the ferrule for an optical fiber or more than 2 optical fibers, similarly. Incidentally, the inverted quadrangular pyramid shaped recesses (positioning marks) of the ferrule are not shown in FIGS. 1A and 1B, and 2A and 2B for simplicity of illustration.

Figure 6A:
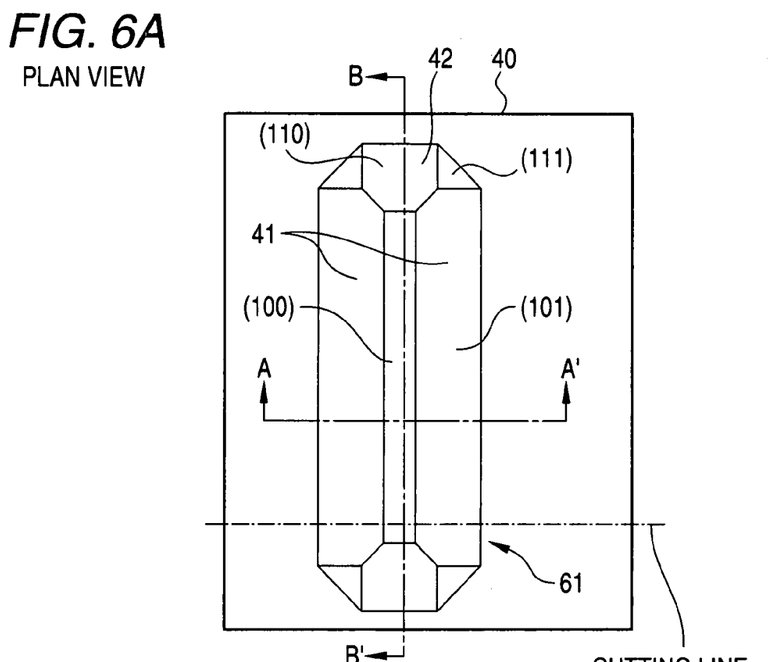
FIG. 6A is a plan view.
Figure 6B:
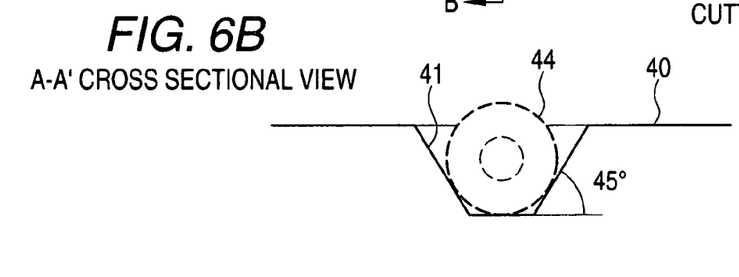
FIG. 6B is a cross section taken along a line A-A' and FIG. 6C is a cross section taken along a line B-B' in FIG. 6A.
Figure 6C:
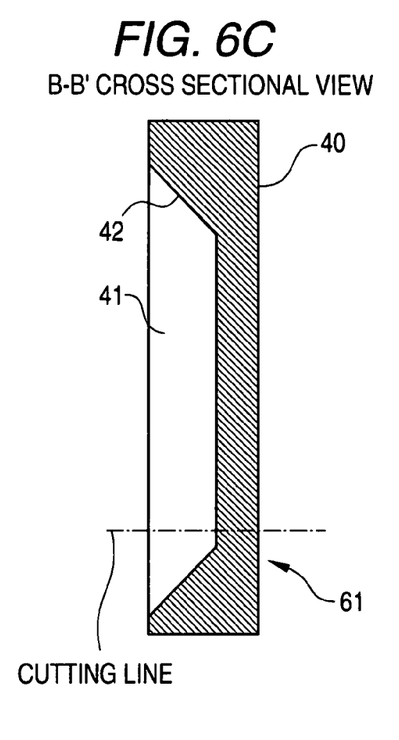

FIG. 6A is a plan view of a pattern for anisotropic etching of Si, FIG. 6B is a cross section taken along a A-A' line in FIG. 6A and FIG. 6C is a cross section taken along a line B-B' in FIG. 6A. As shown in these figures, the V-grooves 41 having 45 faces and the 45 degrees slanted mirrors 42 are formed in the ferrule 40. An end portion 61 of the ferrule 40 is cut away as shown chain lines in the figures. 6A and 6C so that the optical fibers 44 can be arranged in the V-grooves 41 as shown in FIG. 6B.

Figure 7:
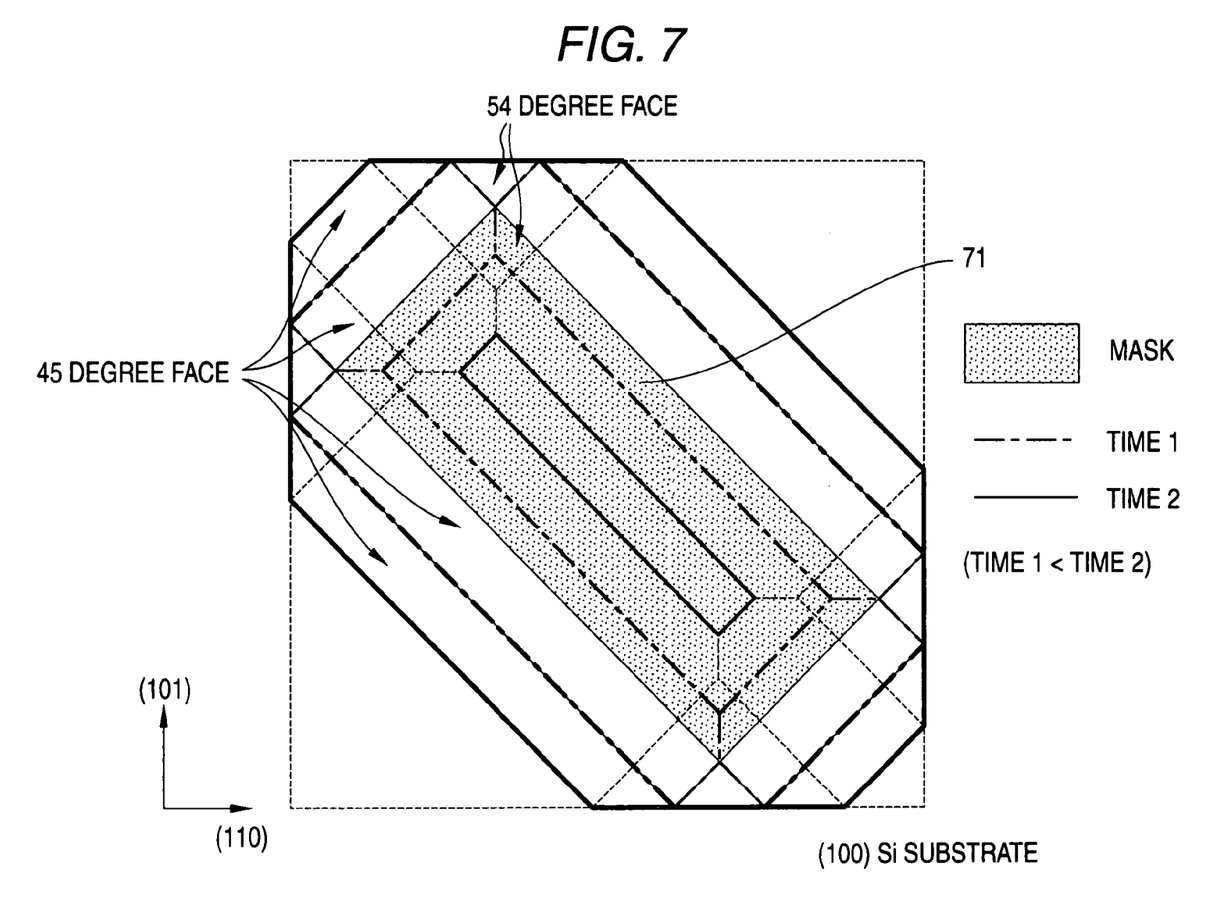
FIG. 7 shows a time dependency of anisotropic etching of Si.

FIG. 7 shows the time dependency of anisotropic etching of Si. In the exemplary embodiment, the etching is performed by arranging a mask 71 on the (100) Si substrate. In this case, a 45 face slanted with respect to the (110) face by 45 degree is formed. Further, the 45 face is formed in a plane rotated by 90 degree. In FIG. 7, chain lines and solid lines show a difference of etching time. When the chain lines show time 1 and the solid lines show time 2, time 1<time 2. It is necessary to stop the etching at an appropriate time instance. The etching time is determined by diameter of the optical fiber as a design parameter. Incidentally, for example, Y. Backlund and L. Rosengren, "New shapes in (100) Si using KOH and EDP etches" J. Micromech. Microeng. 2, (1992), 75-79 describes the 45°anisotropic etching, in detail.

Although the 45 degree surface thus formed is not smooth, it can be used as a mirror for reflecting light from the optical fiber by dealing with the aftermath appropriately. Thereafter, a portion of the 45 degrees slanted mirror is cut away such that the optical fibers can be inserted as described with reference to FIGS. 6A to 6C, resulting in the ferrule for optical fibers. The optical fibers are mounted in the ferrule and fixed in the ferrule by pressing them by a cover member or painting an adhesive. The thus fabricated ferrule is positioned on the waveguide board and fixed thereto.

Figure 8A:
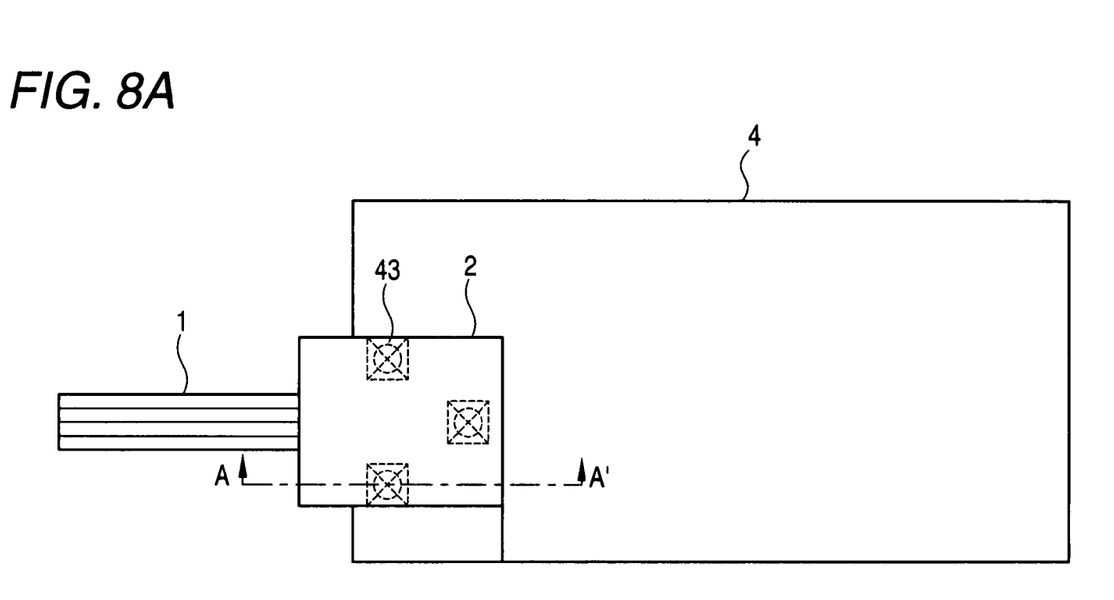
FIG. 8A is a plan view and FIG. 8B is a cross section taken along a line A-A' in FIG. 8A.
Figure 8B:
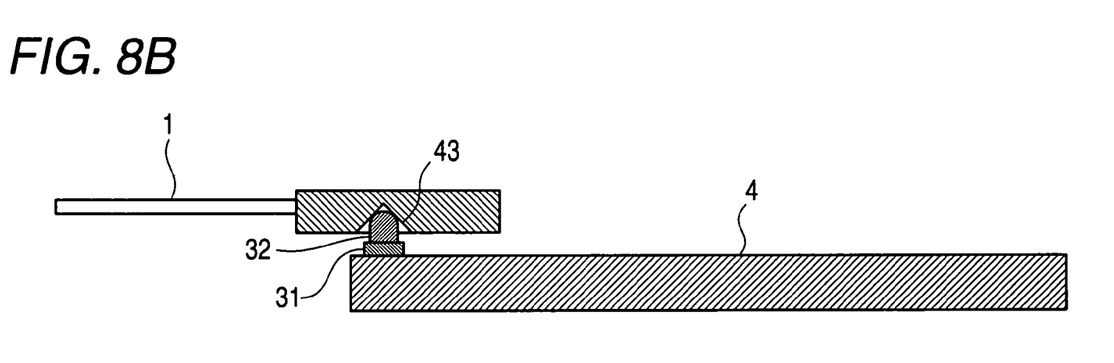

FIG. 8A is a plan view of an example the ferrule positioned and fixed on the waveguide board and FIG. 8B is a cross section taken along a line A-A' in FIG. 8A. In this example, the positioning marks (protrusions) 32 on the side of the board are matched with the respective positioning marks (recesses) 43 on the side of the ferrule. That is, as shown, the ferrule 2 is laid on the positioning protrusions 32 formed on the board 4 such that the solder balls 32 and the quadrangular pyramid shaped recesses 43 are matched by self-adjustment. The height of the ferrule is determined by the height of the solder balls 32. In order to reliably match the ferrule and the board, the mirror may be designed larger than a diameter of light beam. The positions of the protrusions 32 and the recesses 43 in a plane are defined precisely by the printing technology or the photo-lithography. In performing the positioning, the preciseness of positioning is improved by providing three or more positioning marks as mentioned previously. The positioned two members are fixed to each other by pinching them by such as the clip, which is not shown.

As described, the positioning method is made vertically unlike the usual horizontal positioning. By performing the positioning vertically, it becomes possible to realize the positioning of the optical fibers and the waveguide with precision in the printing or the photo-lithography level. In this case, since there is no heat generating portion, the initial positioning preciseness can be maintained. Therefore, there is no need of considering a future mismatching.

Although, in the described exemplary embodiment, anisotropic etching of Si is used for forming the ferrule, the ferrule can be formed by utilizing a molding technology of such as plastics. That is, it is possible to fabricate a molded mono-block ferrule having V-grooves and a mirror surface slanted by 45 degrees with respect to the optical path. In such case, positioning marks can be formed integrally simultaneously. In a case where such part is used, it is necessary to perform a mirror surface finishing of the mirror portion by metal-coating. However, in view of cost, the molding is profitable. Although the matching of the ferrule and the waveguide board is the same as that in the described exemplary embodiment, the difference in preciseness between the positioning marks and the printing or the photo-lithography is not a specific problem when the difference is over 10 μm, in the multimode.

Figure 9A:
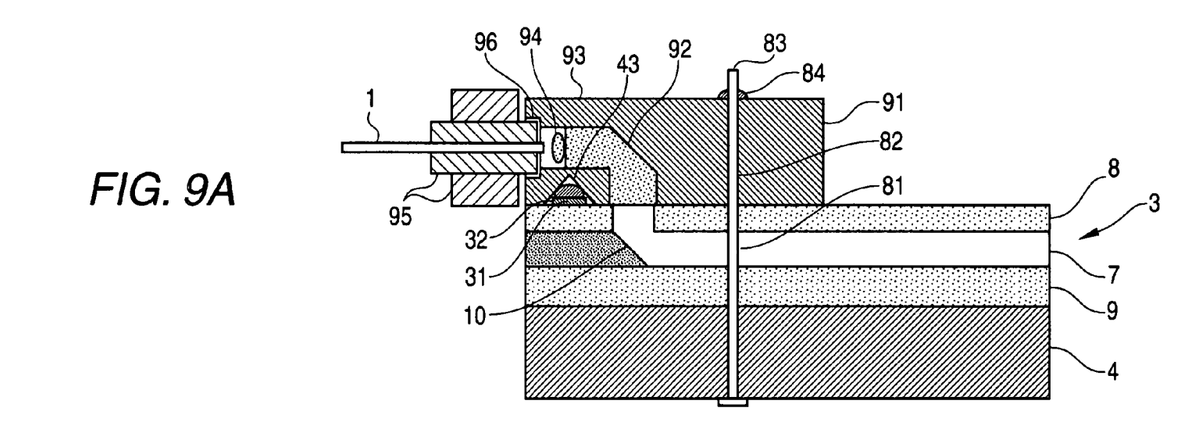
FIG. 9A is a cross section and FIG. 9B is a plan view.
Figure 9B:
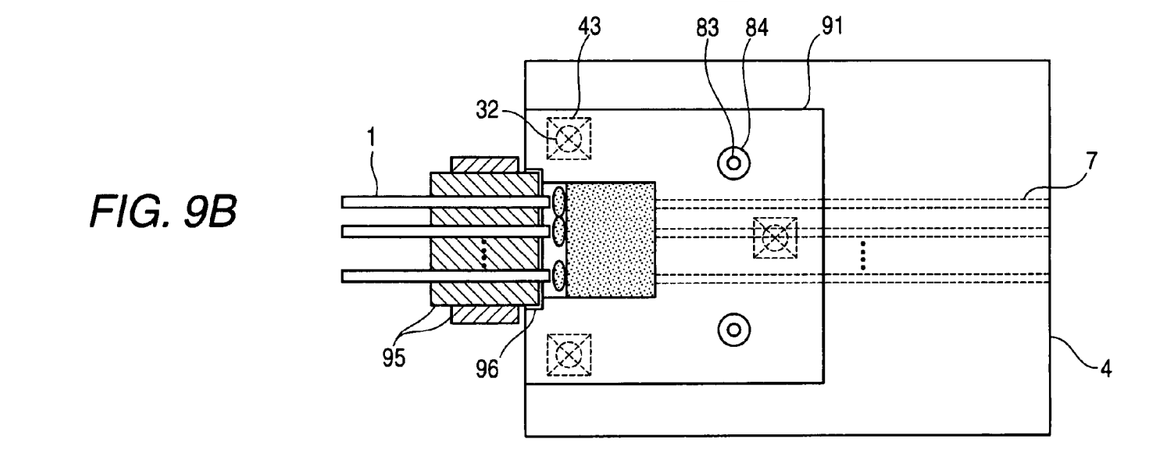

FIG. 9A is a cross section of an optical connecting device according to another exemplary embodiment and FIG. 9B is a plan view thereof. This exemplary embodiment includes a board 4 having an optical waveguide 3 and a receptacle 91 as a connecting portion capable of being optically connected to the optical waveguide 3 on the board 4. The optical waveguide 3 includes a core 7 for guiding light and a clad surrounding the core 7. An upper clad portion 8 and a lower clad portion 9 of the clad pinches the core 7. The receptacle 91 includes a light path bending waveguide 93, which includes a light path bending mirror 92 (slanted by 45 degrees with respect to an optical path) for bending the light path optically connected to the optical waveguide 3 by 90 degrees. The receptacle 91 includes recesses 96 for receiving a plug 95 as an optical fiber holding portion for holding optical fibers 1 optically connected to the light path bending waveguide 93. The receptacle 91 may include a lens 94 provided on the side of the light path bending waveguide 93 to which the optical fibers 1 are connected. In such case, it is possible to use a commercially available light path bending waveguide with lens. Instead of the ferrule 2 described previously, a combination of the receptacle 91 having the light path bending waveguide 93 including the light bending mirror 92 and the plug 95 for holding the optical fibers 1 is used in this exemplary embodiment.

Positioning marks (protrusions) 32 are provided on the board 4, which includes the optical waveguide 3, through pads 31. Further, positioning marks (recesses) 43 to be matched with the positioning marks 32 are formed in a lower surface of the receptacle 91. Three or more positioning marks 32 and three or more positioning marks 43 may be provided. Further, fixing pins 83 for fixing the receptacle 91 to the board 4 by connecting holes 81 formed vertically in the board 4 to holes 82 formed vertically in the receptacle 91 are provided. The pins 83 may be provided in plural locations. The holes 82 and the fixing pins 83 are fixed by adhesive 84 on the upper surface of the receptacle 91. Therefore, the receptacle 91 is reliably fixed to the board 4, so that there is no positional deviation even when the plug 95 is taken out and put in with respect to the receptacle 91. In this exemplary embodiment, the fixing pins 83 are provided on the side of the board 4, but they may be provided on the side of the receptacle 91.

According to this exemplary embodiment, it is possible to obtain a connector, which can be taken out and put in the optical fiber holding portion (plug) with respect to an end portion of the board horizontally. The joining of the receptacle and the plug is performed in horizontal direction. Since a change in a horizontal plane due to expansion and contraction of the board corresponds to a deviation of light beam in axial direction, the structure of this exemplary embodiment is hardly influenced by deformation of the board compared with a case where the board is vertically deformed. In this exemplary embodiment, the receptacle is easily and precisely mounted on the board and the light path bending waveguide is introduced precisely in the receptacle. The matching is usually broken due to difference in coefficient of thermal expansion between the parts in a high temperature and high humidity environment. In view of this, the plug was constructed such that it basically follows deformation of the board by using fixing balls. However, it is difficult to provide an enough margin at a portion where a large deviation occurs, such as the end portion of the board. In this exemplary embodiment, the pluggable connector structure, which is hardly influenced by workability in the end portion of the board and expansion and contraction of the board, is provided.

Figure 10:
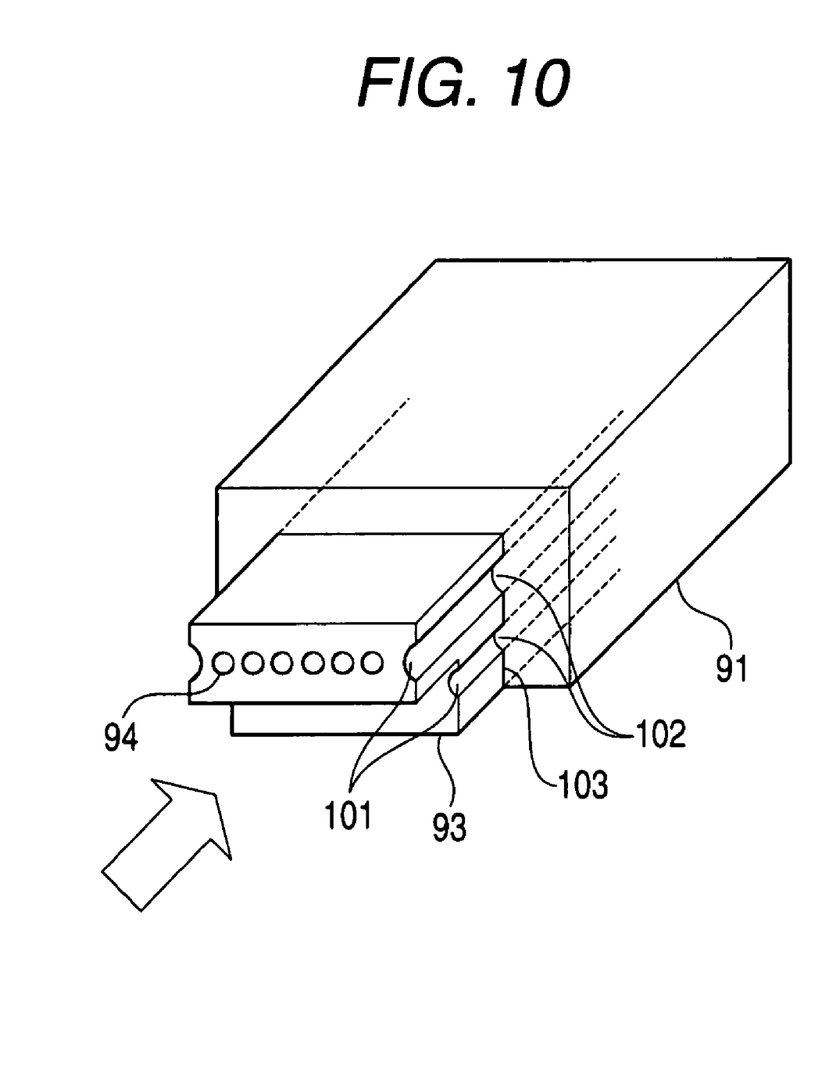
FIG. 10 illustrates an example of an insertion method of a light path bending waveguide to a receptacle.

The light path bending waveguide 93 is press fitted in the receptacle 91 with high precision. FIG. 10 illustrates an example of the inserting method of the light path bending waveguide into the receptacle. In FIG. 10 the recesses of the receptacle for receiving the plug, etc., are not shown for simplicity of illustration. As shown in FIG. 10, grooves 101 are formed in the integrally molded light path bending waveguide 93 and this waveguide 93 is pushed into an opening portion 103 of the receptacle 91 having protrusions 102 corresponding to the grooves 101, in an arrow direction. Alternatively, it is possible to form the protrusions on the side of the light path bending waveguide and the grooves on the side of the receptacle. By using the combination of the grooves and the protrusions, it is possible to obtain highly precise matching between the receptacle and the light path bending waveguide. That is, it is possible to assemble the two parts three dimensionally with high precision. Here, the grooves are provided at the right and left sides of the light path bending waveguide 93 and protrusions are provided at the corresponding portions of the receptacle 91. However, the grooves may be formed at any peripheral portions of the light path bending waveguide 93, and the protrusions may be formed at corresponding portions of the receptacle 91. Incidentally, the integrally molded light path bending waveguide for plural channels can be purchased in the market.

Next, a method for fixing the receptacle 91 on the board 4 having the optical waveguide 3 with high precision will be described. First, the receptacle 91 is tentatively fixed to the board 4 by using a spot of light coming up through the optical waveguide 3 and the positioning marks 32 and 43 formed precisely by photo-lithography and then the soldering is performed by SMT (Surface Mount Technology). The positioning marks (solder balls) 32 are formed on the pads 31. The solder balls (protrusions) 32 are formed by self-adjustment according to a pattern on the side of the board. On the other hand, plural positioning marks (recesses) 43 are formed on the side of the receptacle correspondingly to pattern precision on the side of the board. Three dimensional positions are defined by using at least three positioning marks 32 and at least three positioning marks 43. The configuration of these positioning marks may be quadrangular pyramids or elliptic cones. When the fixing pins 83 are used, the fixing pins are tentatively fixed at a temperature higher than the melting point of the positioning solder balls. The matching level of the fixing pins 83 and the receptacle 91 may be rough. Thereafter, electronic parts are mounted on the board including the waveguide 3 integrally and the receptacle 91 is fixed to the board 4 by melting solder according to SMT. Thereafter, the connector is completed by assembling the receptacle and known parts of the plug such as MT ferrule or utilizing the usual method using a one-touch nail or clip. The recesses on the side of the receptacle can be formed in alignment with the receptacle with integral molding preciseness.

By mounting such receptacle on the board including the optical waveguide and mounting the plug to the receptacle pluggably by one-touch with enough margin, it is possible to guide an external light signal from the optical fiber to the optical waveguide within the board. It is possible to utilize the standardized MT ferrule for this mounting.

Figure 11A:
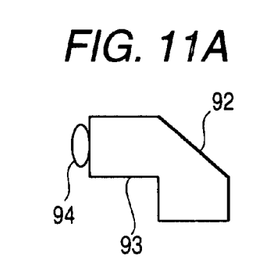
FIGS. 11A to FIG. 11G show an example of a fabrication method of the optical connecting device according to the optical connecting device shown in FIGS. 9A and 9B.
Figure 11B:
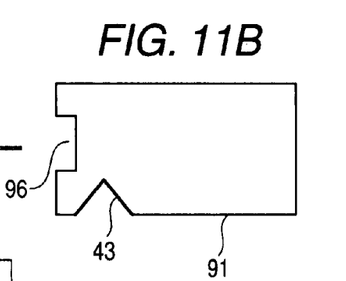
Figure 11C:
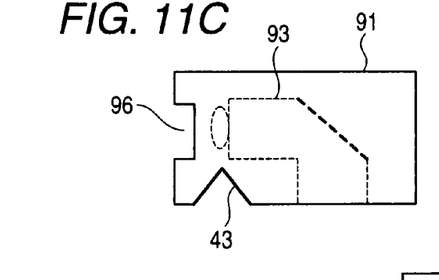

FIGS. 11A to 11G show an example of fabrication of the optical connecting device according to the exemplary embodiment sown in FIGS. 9A and 9B. First, the receptacle 91 shown in FIG. 11C is fabricated by pressure fitting the integrally molded optical path conversion waveguide 93 as shown in FIG. 11A in the receptacle 91 formed of thermally conductive plastics as shown in FIG. 11B. In this case, the fitting alignment may be performed by forming the grooves and the protrusions shown in FIG. 10. Further, holes (not shown) for inserting the fixing pins 83 and the positioning marks (recesses) 43, which are necessary for the next process, are preliminarily formed. The configuration of the positioning recess 43 may be the inverted pyramid. However, the configuration is not limited thereto. The configuration of the positioning mark can be selected such that the fitting precision with respect to the solder ball (protrusion) is improved.

Figure 11D:
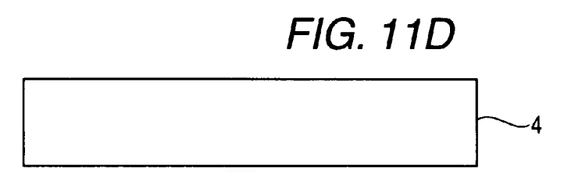
Figure 11E:
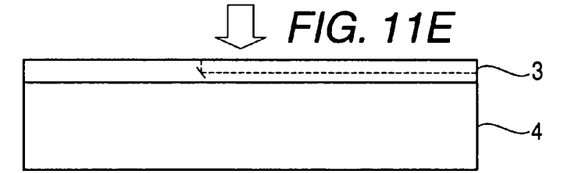
Figure 11F:
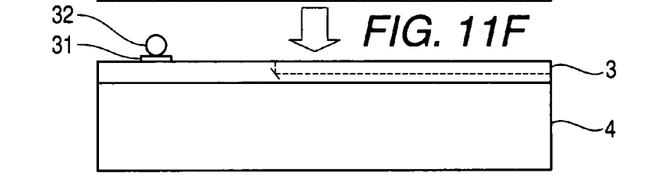

On the other hand, the optical waveguide 3 shown in FIG. 11E and the light path bending mirror 10 are formed on a usual PWBA board (FR-4) 4 shown in FIG. 11D. When it is a waveguide for multimode (MM), light beam having diameter of about several 10 μm is emitted to the board 4 vertically. The metal pattern 31 of such as copper is formed on the board 4 by aligning it with the light path bending mirror (micro-mirror) 10. Thereafter, solders, beads having predetermined size or metal balls (solder balls) 32 are formed on the metal pattern 31 as shown in FIG. 11F. Height, configuration or size of the metal pattern 31 and the solder ball 32 are selected such that it is effective in the positioning. In this case, the solder ball 32 is formed by selecting the position and a distance between the board and the receptacle precisely. Three or more poisoning marks 32 may be provided. Since, in this exemplary embodiment, the micro-mirror is patterned by using photoprinting technology, the metal pattern is formed in alignment with the layer of the micro mirror. That is, the two patterns are positioned with precision of photolithography.

Figure 11G:
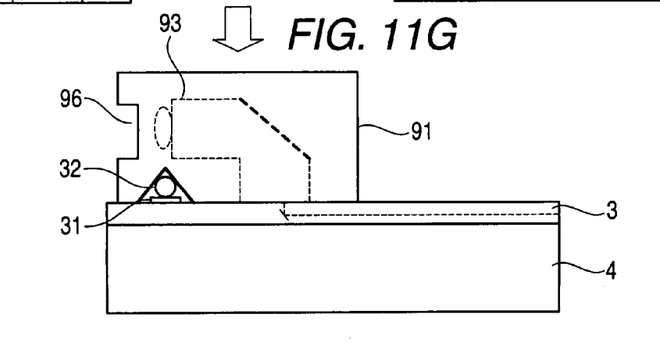

The receptacle 91 thus fabricated is mounted on the board 4 having the optical waveguide 3, as shown in FIG. 11G. In mounting the receptacle 91, the receptacle and the board are roughly registered by using the fixing pins 83, which are not shown in FIGS. 11A to 11G, positioning the recesses 43 of the receptacle 91 and the solder balls 32 on the board 4 with high precision and then finally fixing by the fixing pins 83.

Figure 12:
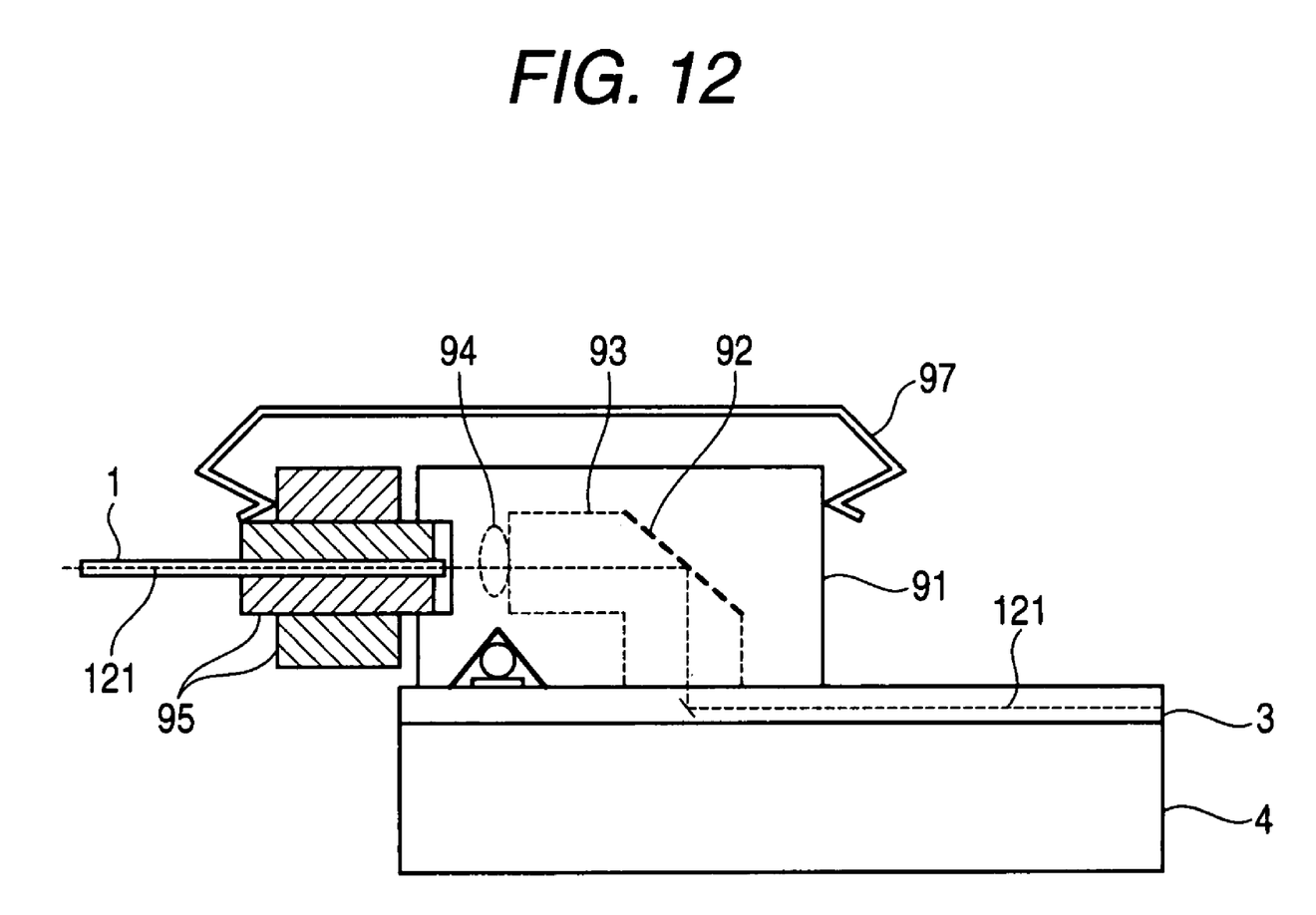
FIG. 12 shows an example of the optical connecting device having a receptacle mounted on the board including the optical waveguide to which a plug is connected.

Thereafter, the plug 95, in which the optical fibers 1 are assembled such that they are matched with the receptacle 91 without centering, is connected with the receptacle 91 and fixed in its state by a spring 97, etc. The process of positioning by locator pins (not shown in the figure) and fixing by the spring 97 is substantially the same as the process employed in the MT ferrule. FIG. 12 shows an example of the optical connecting device, in which the plug is connected with the receptacle mounted on the board having the optical waveguide. A light path 121 in this exemplary embodiment is formed along a line from the optical fiber 1 to the optical waveguide 3 of the board 4 through the lens 94 and the light pat bending waveguide 93 including the light path bending mirror 92. There are various methods for fixing the plug and the receptacle together. Any of the methods can be utilized so long as that the both parts are fixed together by one-touch. According to the fixing method for fixing the optical fibers and the optical waveguide together, without centering in the case of the MM, it is possible to obtain the optical connecting device capable of sufficiently reducing the connecting loss.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An optical connecting device comprising:
   a substrate comprising an optical waveguide; and
   a connecting portion provided on the substrate and optically connecting to the optical waveguide, the connecting portion comprising a silicon base, the silicon base comprising:
   a groove that fixes an optical fiber; and
   a 90 degrees optical path conversion mirror that includes a crystal face of the silicon base, wherein the 90 degrees optical path conversion mirror is disposed to face an end of the optical fiber.

2. The optical connecting device according to claim 1, wherein the optical waveguide comprises an optical path conversion mirror converting by 90 degrees a direction of light which is incident from the connecting portion.

3. The optical connecting device according to claim 1, wherein the groove substantially has a V-like shape in a cross section.

4. The optical connecting device according to claim 1, wherein the 90 degrees optical path conversion mirror and the groove are integrally formed.

5. The optical connecting device according to claim 1, wherein the 90 degrees optical path conversion mirror is slanted by 45 degrees with respect to crystal face (100) of the silicon base.

6. An optical connecting device comprising:
   a substrate comprising an optical waveguide, the substrate being provided with a first positioning mark; and
   a connecting portion positioned on the substrate in accordance with a second positioning mark provided on the connecting portion corresponding to the first positioning mark, the connecting portion comprising a silicon base, the silicon base comprising:
   a groove that fixes an optical fiber; and
   a 90 degrees optical path conversion mirror that includes a crystal face of the silicon base, wherein the 90 degrees optical path conversion mirror is disposed to face an end of the optical fiber.

7. The optical connecting device according to claim 6, wherein the substrate is provided with least three first positioning marks, and the connecting portion is provided with at least three second positioning marks.

8. The optical connecting device according to claim 6, wherein the first positioning mark is a semi-spherical protrusion, and the second positioning mark is an inverted quadrangular pyramidal recess.

9. The optical connecting device according to claim 6, wherein the 90 degrees optical path conversion mirror is slanted by 45 degrees with respect to crystal face (100) of the silicon base.

10. A method of forming a connector optically connectable to a substrate including an optical waveguide, comprising the steps of:
    forming a substrate comprising an optical waveguide; and
    forming a connecting portion provided on the substrate and optically connecting to the optical waveguide, the connecting portion comprising a base, the base comprising a groove that fixes an optical fiber, and a 90 degrees optical path conversion mirror disposed to face an end of the optical fiber, wherein the 90 degrees optical path conversion mirror are formed by anisotropic etching of Si.

11. A method of forming a connector optically connectable to a substrate including an optical waveguide, comprising the steps of:
    forming a substrate comprising an optical waveguide; and
    forming a connecting portion provided on the substrate and optically connecting to the optical waveguide, the connecting portion comprising a silicon base, the silicon base comprising a groove that fixes an optical fiber, and a 90 degrees optical path conversion mirror that includes a crystal face of the silicon base and that is disposed to face an end of the optical fiber, wherein the 90 degrees optical path conversion mirror and the groove are formed by a molding technique.

12. The method of forming a connector optically connectable to a substrate including an optical waveguide according to claim 11,
    wherein the 90 degrees optical path conversion mirror is slanted by 45 degrees with respect to crystal face (100) of the silicon base.

13. An optical connecting device comprising:
    a substrate comprising an optical waveguide; and
    a connecting portion provided on the substrate, the connecting portion being optically connectable with the optical waveguide; the connecting portion comprising a silicon base, the silicon base comprising:

an optical path conversion waveguide comprising a 90 degrees optical path conversion mirror which converts an optical path optically connected with the optical waveguide and which includes a crystal face of the silicon base.

14. The optical connecting device according to claim 13, wherein the substrate is provided with a first positioning mark, and the connecting portion is provided with a second positioning mark on a lower surface thereof, the second positioning mark corresponding in position to the first positioning mark.

15. The optical connecting device according to claim 14, wherein the first positioning mark is a protrusion, and the second positioning mark is a recess.

16. The optical connecting device according to claim 14, wherein the first position mark comprises at least three first positioning marks, and the second positioning mark comprises at least three second positioning marks.

17. The optical connecting device according to claim 13, further comprising:

a fixing pin that fixes the connecting portion to the substrate by connecting a first hole formed vertically in the substrate and a second hole formed vertically in the connecting portion correspondingly to the first hole.

18. The optical connecting device according to claim 13, wherein the connecting portion is provided with a recess that receives an optical fiber holding portion holding an optical fiber optically connected to the optical path conversion waveguide.

19. The optical connecting device according to claim 18, wherein a lens is provided on a side of the connecting portion optically connected to the optical fiber.

20. The optical connecting device according to claim 13, wherein the 90 degrees optical path conversion mirror is slanted by 45 degrees with respect to crystal face (100) of the silicon base.

* * * * *